United States Patent Office

Re. 28,234
Reissued Nov. 5, 1974

28,234

N-NITROSO-4,4'-BIS(2-PHENYLISOPROPYL)-DIPHENYLAMINE

Guy Bertrand, Choisy-le-Roi, and Jean Marc Maison, Paris, France, assignors to Rhone-Poulenc S.A., Paris, France

No Drawing. Original No. 3,668,253, dated June 6, 1972, Ser. No. 70,724, Sept. 9, 1970, which is a division of application Ser. No. 757,757, Sept. 5, 1968, now Patent No. 3,573,252. Application for reissue Jan. 31, 1973, Ser. No. 328,264

Claims priority, application France, Sept. 20, 1967, 121,670

Int. Cl. C07c *87/28*

U.S. Cl. 260—570 R 1 Claim

Matter enclosed in heavy brackets [ ] appears in the original patent but forms no part of this reissue specification; matter printed in italics indicates the additions made by reissue.

ABSTRACT OF THE DISCLOSURE

N-Nitroso-4,4'-bis(2-phenylisopropyl)diphenylamine, a new compound, is valuable as a vulcanization retarder for elastomers. It has an anti-ageing effect on the vulcanized product.

This application is a division of Ser. No. 757,757, filed Sept. 5, 1968 and now U.S. Pat. No. 3,573,252.

The present invention provides a new compound which is useful as a retarder of the vulcanization of natural and synthetic rubbers and which furthermore possesses valuable properties of protection against deterioration due to the ageing of vulcanized articles.

It is well known that during the various stages of using a mixture based on rubber and containing the ingredients required for vulcanization, in particular sulphur and vulcanization accelerators, prolonged heatings take place which can lead to premature vulcanization. Such pre-vulcanizations make the mixtures unsuitable for their subsequent conversion.

The risks of pre-vulcanization may be reduced by using a retarded-action accelerator such as, for example, an accelerator of the sulphenamido class and/or by adding to the composition a vulcanization retarder, also called an anti-scorching agent. The effect of such a vulcanization retarder must be limited to the stage of using the mixture only and must cease during the vulcanization at a higher temperature so as not to increase the duration of cure of the mixtures.

It is also well known that vulcanized rubber over the course of time undergoes considerable degradation which is, in particular, due to the action of oxygen and heat as well as to the particular conditions of use of the finished article. It is accordingly desirable to protect vulcanized rubber against the destructive effect of these various factors.

Up to now numerous products are known which can be used to combat the risks of scorching of raw mixtures, for example organic anhydrides and acids such as phthalic anhydride, salicylic acid, and nitroso-amine derivatives such as nitrosodiphenylamine. All these products are effective under certain conditions, but they are not always completely satisfactory because the former, the organic anhydrides and acids, do not completely have the desired effect on accelerators of the sulpheramide class, while nitrosodiphenylamine strongly colors the vulcanization mixtures, so that the latter mixtures can mark lacquers and paints by contact.

Very many chemical substances are also known which may be used to protect vulcanized rubber articles against ageing.

The present invention provides a new compound which simultaneously possesses both valuable retarder properties, and also the protective properties which are indispensable for good preservation of vulcanized rubber articles. This new compound is N-nitroso-4,4'-bis-(2-phenylisopropyl)-diphenylamino. This new compound has the formula:

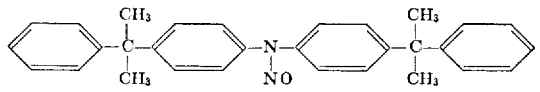

Its melting point is 100° C., its absorption maximum at 298 mμ, $$E^{1\%}_{1\,cm.}=130,$$

and its absorption minimum at 275 mμ, $$E^{1\%}_{1\,cm.}=124.$$

This compound is a very effective retarder for counteracting the scorching of mixtures based on natural rubber or on synthetic unsaturated elastomers such as styrene-butadiene and butadiene-acrylonitrile copolymers, polybutadiene, polyisoprene, and generally all unsaturated elastomers which can be vulcanized with sulphur. N-Nitroso-4,4'-bis(2-phenylisopropyl)diphenylamine is used in an amount generally from 0.1 to 5 parts by weight (preferably 0.25 to 2 parts) per 100 parts by weight of the unsaturated elastomer.

N-Nitroso-4,4'-bis(2 - phenylisopropyl)-diphenylamine does not significantly interfere with the vulcanization proper either from the point of view of speed or from the point of view of the properties of the vulcanized product. The new compound also makes it possible to prepare vulcanized rubber articles of much retarded degradation, and it has the additional advantage, namely that it causes considerably less severe marking of lacquers and paints than that caused by N-nitrosodiphenylamine.

The product of the invention may be prepared from 4,4'-bis(2-phenylisopropyl)-diphenylamine by any process of introducing the nitroso group. It is, for example, possible to disperse 4,4'-bis(2-phenylisopropyl)-diphenylamine in water at a suitable temperature (for instance at about 90° C.) and add a sufficient quantity of sodium nitrite and a strong inorganic acid, such as for example hydrochloric acid or sulphuric acid, to carry out the introduction of the nitroso group, and to separate the resulting product in any desired manner, such as for example by filtration after cooling or by decantation of the liquid organic layer.

The use of the new compound of the invention in mixtures based on rubber is illustrated in the following Examples:

EXAMPLE 1

This example shows the influence of the concentration of N-nitroso-4,4'-bis(2 - phenylisopropyl)-diphenylamine on scorching in a mixture based on natural rubber filled with carbon black.

The following mixture is prepared in a laboratory internal mixer:

| | Parts by weight |
|---|---|
| Natural smoked rubber sheet | 100 |
| Zinc oxide | 5 |
| Stearic acid | 2 |
| High abrasion furnace carbon black | 50 |
| Pine tar | 3 |

The following ingredients are added to the above mixture on a roll mill:

| | Parts by weight |
|---|---|
| Sulphur | 2.25 |
| N-cyclohexylbenzothiozylsulphenamide | 0.50 |
| N-nitroso-4,4'-bis(2-phenylsiopropyl)-diphenylamine | As indicated below |

After being left for 24 hours, the scorching time of the mixtures is measured on a consistometer of the Mooney type at 120° and 130° C.

The mixtures are vulcanized in a press at 143° C. as 4 mm. thick sheets for various times and the properties of the vulcanized articles thus obtained are measured as a function of the duration of the vulcanization.

The results obtained are shown in Table I.

TABLE I

| Properties measured | N-nitroso-bis(2-phenylisopropyl)-diphenylamine (parts by weight) | | |
|---|---|---|---|
| | 0 | 0.50 | 1.0 |
| Scorching time (min.): | | | |
| At 120° C | 22.5 | 25.00 | 28.75 |
| At 130° C | 13.5 | 14.75 | 16.25 |
| Vulcanization at 143° C.: | | | |
| Tear resistance (kg./cm.²): | | | |
| After 20 minutes | 246 | 245 | 233 |
| After 25 minutes | 246 | 248 | 243 |
| After 30 minutes | 246 | 248 | 249 |
| Modulus at 300% (kg./cm.²): | | | |
| After 20 minutes | 110 | 110 | 104 |
| After 25 minutes | 116 | 118 | 113 |
| After 30 minutes | 120 | 123 | 117 |
| Elongation at break, percent: | | | |
| After 20 minutes | 550 | 535 | 535 |
| After 25 minutes | 535 | 535 | 530 |
| After 30 minutes | 510 | 510 | 530 |

These results show that N-nitroso-4,4'-bis(2-phenylisopropyl)-diphenylamine increases the scorching time with practically no modification of properties of the vulcanized articles.

If the N-cyclohexylbenzothiazylsulphenamide in the vulcanizable composition is replaced by an equal weight of 2-(N-morpholinothio)-benzothiazole, the relative variations of the scorching time as a function of the concentration of N-nitroso-4,4'-bis(2-phenylisopropyl)-diphenylamine remain of the same order of magnitude.

EXAMPLE 2

This example shows the influence of N-nitroso-4,4'-bis(2-phenylisopropyl)-diphenylamine on the scorching of a mixture based on butadienestyrene copolymer containing white fillers.

The following mixture is prepared on a roll mill:

| | Parts by weight |
|---|---|
| Styrene-butadiene copolymer of type 1502 | 100 |
| Zinc oxide | 5 |
| Stearic acid | 2.5 |
| Ultra-fine silica | 22.5 |
| Kaolin | 22.5 |
| Titanium dioxide | 10 |
| Diethylene glycol | 3.5 |
| Sulphur | 2 |
| Zinc mercaptobenzothiazolate | 1.2 |
| Zinc dimethyldithiocarbamate | 0.3 |
| N-nitroso-4,4'-bis(2-phenylisopropyl)-diphenylamine | As indicated below |

After being left for 24 hours, the scorching time of the mixtures is measured on a consistometer of the Mooney type at 120° C. Furthermore the mixtures are vulcanized in a press at 153° C. and the properties obtained at the optimum vulcanization time (the shortest vulcanization time producing the highest modulus at 500 percent) are measured.

Finally, the raw mixtures are stored for 15 days at ambient temperature and their scorching time at 120° C. is again measured.

The results are given in Table II below.

TABLE II

| Properties measured | N-nitroso-4,4' bis-(2-phenylisopropyl)diphenylamine (partsby weight) | | |
|---|---|---|---|
| | 0 | 0.5 | 1 |
| Scorching time at 120° C.: | | | |
| After preparation of the mixtures | 9 | 14.50 | 15.50 |
| After storage for 15 days | 7 | 22.50 | 28.50 |
| Vulcanization at 153° C.: | | | |
| Optimum time (minutes) | 15 | 15 | 15 |
| Tear strength (kg./cm.²) | 98 | 102 | 103 |
| Modulus at 500 percent (kg./cm.²) | 28 | 29 | 30 |
| Elongation at break (percent) | 750 | 765 | 760 |
| Shore A hardness | 54 | 54 | 54 |

EXAMPLE 3

This Example shows the protective properties of N-nitroso-4,4'-bis(2-phenylisopropyl)diphenylamine against heat ageing of vulcanized mixtures.

Mixtures, which are vulcanized at 145° C. for the optimum time are prepared as in Example 1. The vulcanized articles obtained are introduced, as samples, into a circulating air oven at 80° C. and the change in strength and elongation at break are measured. The time required to achieve a certain reduction of the properties measured is then determined. Mixtures were also prepared as in Example 1 but replacing the N-nitroso-4,4'-bis(2-phenylisopropyl)-diphenylamine by N-nitrosodiphenylamino.

The results obtained are shown in Table III.

TABLE III

| | N-nitroso-4,4' isopropyl)-diphenyl amine (parts by wt.) | | | | N-nitrosodiphenylamine (parts by weight) | |
|---|---|---|---|---|---|---|
| | 0 | 0.25 | 0.50 | 1 | 0.5 | 1 |
| Time required to achieve a reduction in tear strength of 50% (days) | 6½ | 10 | 11½ | 13 | 7½ | 8½ |
| Time required to achieve a reduction of elongation at break of 50% (days) | 9½ | 14 | 15 | 16 | 9½ | 10½ |

The excellent protection afforded by the compound of the invention relative to the control material and also relative to nitrosodiphenylamine can clearly be seen.

EXAMPLE 4

A further advantage of N-nitroso-4,4'-bis(2-phenylisopropyl) - diphenylamine compared to N-nitrosodiphenylamine, namely its much less pronounced marking of lacquers and paints, is demonstrated, in this Example.

Mixtures prepared as in Example 1 are vulcanized for the optimum time at 143° C. Samples of these vulcanized articles are brought into contact with a white alkyd paint deposited on a metallic support. The time for the appearance of a coloration on the paint is observed with each of the two diphenylamine derivatives.

| | | Time for appearance of a coloration in the paint |
|---|---|---|
| Control | | 90 hours. |
| N-nitroso-4,4'-bis(2-phenylisopropyl)-diphenylamine. | 0.5 parts by weight | 75 hours. |
| | 1 part by weight | Do. |
| N-nitrosodiphenylamine | 0.5 parts by weight | 27 hours. |
| | 1 part by weight | 19 hours. |

EXAMPLE 5

The following composition, with the figures expressing parts by weight, is prepared with the aid of a mixer

| | |
|---|---|
| Cis-1,4-polybutadiene | 100 |
| Zinc oxide | 5 |
| Stearic acid | 3 |
| ISAF carbon black | 50 |
| Pin tar | 10 |

The following ingredients (parts by weight) are then added thereto on a roll mill

| | |
|---|---|
| Sulphur | 1 |
| N-cyclohexylbenzothiazylsulphonamide | 2 |
| N - nitroso - 4,4' - bis(2 - phenylisopropyl) - diphenylamine | As indicated below |

After being left for 24 hours, the scorching time of the mixtures is measured on a consistometer of the Mooney type at 130° C. Furthermore the properties of mixtures vulcanized at 153° C. are measured as a function of the duration of vulcanization. The results are collected in Table IV.

TABLE IV

| | N - nitroso - 4,4' - bis(2 - phenylisopropyl)-diphenylamine (parts by weight) | | | | | |
|---|---|---|---|---|---|---|
| | 0 | | | 1 | | |
| Scorching time at 130° C (in minutes) | 26.25 | | | 30.25 | | |
| Vulcanization at 153° C.: | | | | | | |
| Duration (in min.) | 20 | 25 | 30 | 20 | 25 | 30 |
| Tear strength (kg./cm.²) | 129 | 140 | 133 | 128 | 134 | 122 |
| 300% modulus (kg./cm.²) | 63 | 63 | 62 | 57 | 59 | 60 |
| Elongation at break (percent) | 300 | 525 | 505 | 510 | 525 | 485 |

EXAMPLE 6

This example differs essentially from Example 5 by the replacement of the polybutadiene by polyisoprene.

The following mixture (in parts by weight) is prepared in a laboratory internal mixer.

| | |
|---|---|
| Cis-1,4-polyisoprene | 100 |
| Zinc oxide | 5 |
| Stearic acid | 3 |
| High abrasion furnace carbon black | 50 |
| Dutrex V 10 (plasticizer obtained from petroleum) | 3 |

The following ingredients are added to this mixture on a roll mill:

| | |
|---|---|
| Sulphur | 2.5 |
| N-cyclohexylbenzothiazylsulphenamide | 1 |
| N - nitroso - 4,4' - bis(2 - phenylisopropyl)-diphenylamine | As indicated |

The results obtained are shown in Table V.

TABLE V

| | N-nitroso-4,4'-bis-(2-phenylisopropyl)-diphenylamine (parts by weight) | | | | | |
|---|---|---|---|---|---|---|
| | 0 | | | 1 | | |
| Mooney scorching time (in minutes): | | | | | | |
| At 120° C | 32 | | | 35.75 | | |
| At 130° C | 17.75 | | | 20 | | |
| Vulcanization at 143° C.: | | | | | | |
| Duration (minutes) | 17.5 | 20 | 25 | 17.5 | 20 | 25 |
| Tear strength (kg./cm.²) | 232 | 255 | 232 | 254 | 259 | 234 |
| 300% modulus (kg./cm.²) | 123 | 132 | 138 | 107 | 115 | 127 |
| Elongation at break (percent) | 480 | 505 | 445 | 555 | 545 | 475 |

EXAMPLE 7

This Example essentially differs from Example 5 by the replacement of the polybutadiene by a styrene-butadiene copolymer.

The following mixture (parts by weight) is prepared in a laboratory internal mixer

| | |
|---|---|
| Styrene-butadiene copolymer, type 1509 | 100 |
| Zinc oxide | 2 |
| Stearic acid | 2 |
| High abrasion furnace carbon black | 50 |
| Dutrex V 10 | 8 |

The following ingredients are added to the above mixture on a roll mill:

| | |
|---|---|
| Suphur | 2 |
| N-cyclohexylbenzothiazylsulphenamide | 1 |
| N - nitroso - 4,4' - bis(2 - phenylisopropyl)-diphenylamine | As indicated below |

The results obtained are shown in Table VI.

TABLE IV

| | N - nitroso - 4,4' - bis(2 - phenylisopropyl)-diphenylamine (parts by weight) | | | |
|---|---|---|---|---|
| | 0 | | 1 | |
| Mooney scorching time (in minutes): | | | | |
| At 120° C | 46 | | 55.25 | |
| At 130° C | 14.5 | | 16.25 | |
| Vulcanization at 153° C.: | | | | |
| Duration (minutes) | 30 | 35 | 35 | 40 |
| Tear strength (kg./cm.²) | 198 | 184 | 162 | 182 |
| 300% modulus (kg./cm.²) | 93 | 93 | 75 | 77 |
| Elongation at break (percent) | 495 | 460 | 525 | 530 |

We claim:

1. N-nitroso-4,4'-bis(2-phenylisopropyl)-diphenylamine.

References Cited

The following references, cited by the Examiner, are of record in the patented file of this patent or the original patent.

UNITED STATES PATENTS 3,573,252 3/1971 Bertrand et al. ---- 260—570 X

ROBERT V. HINES, Primary Examiner

U.S. Cl. X.R.

260—23.7 (M), 41.5 (R), 45.9 (R), 781, 806, 808